Nov. 3, 1942.  R. W. BECKETT  2,300,903
ELECTRICAL IGNITION AND FUEL SUPPLY SYSTEM FOR OIL BURNERS
Filed Feb. 5, 1940  4 Sheets-Sheet 2
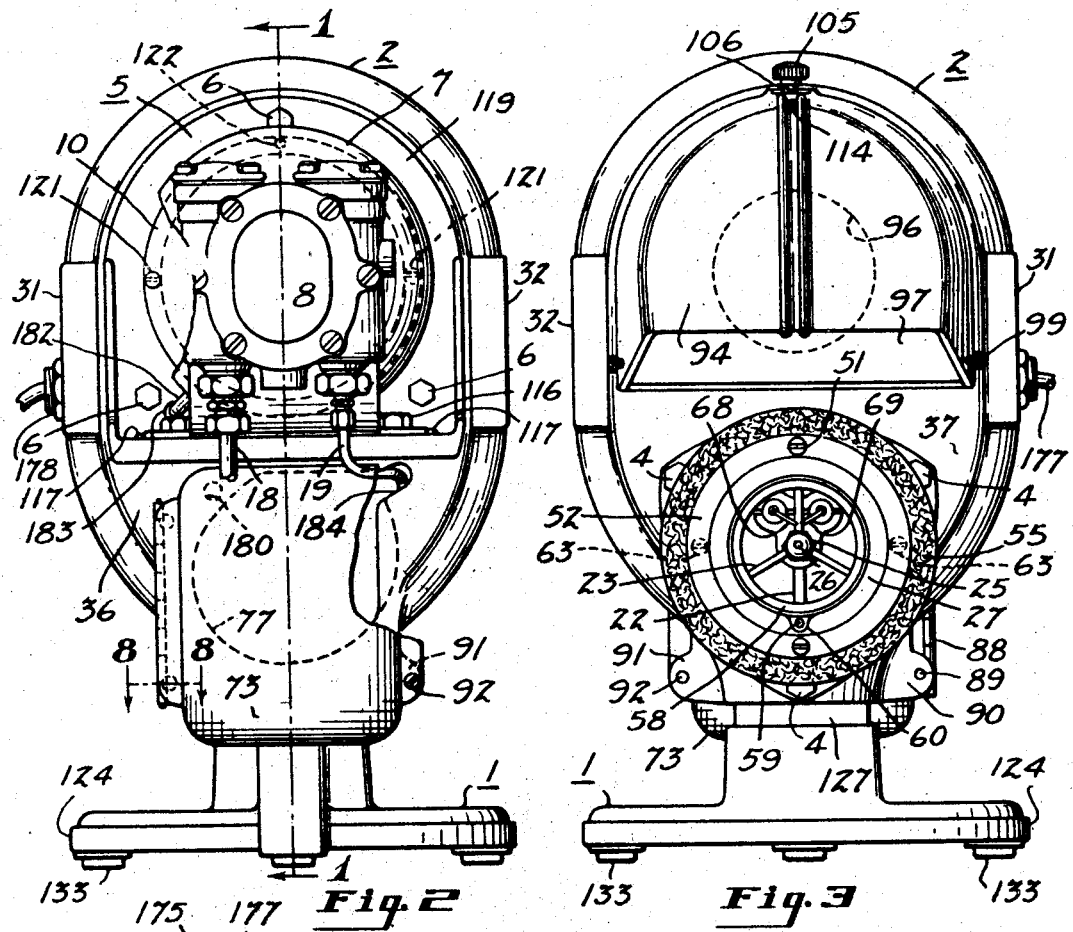
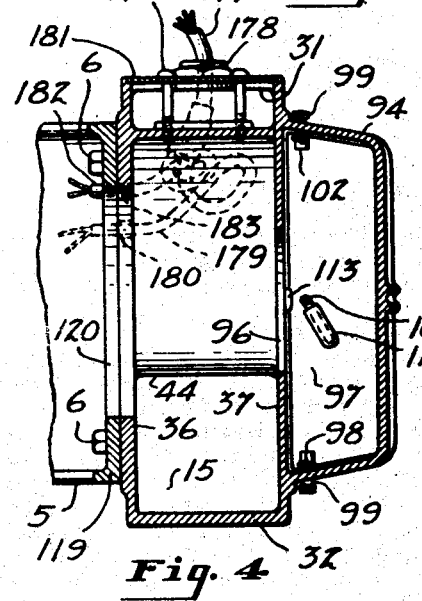
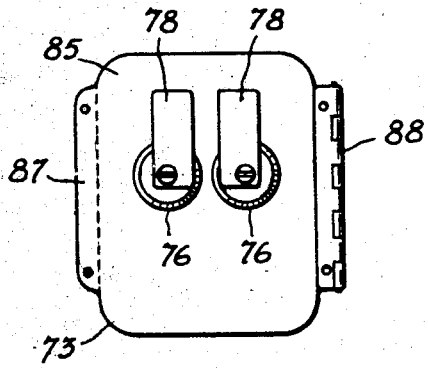
INVENTOR
REGINALD W. BECKETT
BY
Evans & McCoy
ATTORNEYS Nov. 3, 1942.    R. W. BECKETT    2,300,903
ELECTRICAL IGNITION AND FUEL SUPPLY SYSTEM FOR OIL BURNERS
Filed Feb. 5, 1940    4 Sheets-Sheet 3

INVENTOR
REGINALD W. BECKETT
BY Evans + McCoy
ATTORNEYS

Nov. 3, 1942.                    R. W. BECKETT                        2,300,903
          ELECTRICAL IGNITION AND FUEL SUPPLY SYSTEM FOR OIL BURNERS
                 Filed Feb. 5, 1940           4 Sheets-Sheet 4

INVENTOR
REGINALD W. BECKETT
BY
Evans + McCoy
ATTORNEYS

Patented Nov. 3, 1942

2,300,903

UNITED STATES PATENT OFFICE 2,300,903

ELECTRICAL IGNITION AND FUEL SUPPLY SYSTEM FOR OIL BURNERS

Reginald W. Beckett, Elyria, Ohio

Application February 5, 1940, Serial No. 317,244

11 Claims. (Cl. 158—28)

This invention relates to oil burners, and more particularly to the construction and arrangement of electrical ignition apparatus and fuel supply means for fuel burners of the character mentioned. This application is a continuation in part of my copending application Serial No. 188,731, filed February 4, 1938.

It is an object of the invention to provide an improved ignition apparatus for oil burners and the like which may readily be removed from or adjusted in the burners, and which is reliable and efficient in operation.

Another object is to provide an oil burner having an ignition electrode assembly that can be withdrawn from the burner housing while the burner is attached to or installed in a furnace or boiler with a minimum of time and effort.

Another object is to provide an ignition and fuel supply system for an oil burner or the like in which an access opening is provided through which the ignition electrodes can be serviced, and which is arranged to automatically disconnect the ignition electrodes from the electrical current supply means or transformer when the access opening is uncovered.

Another and principal object of the invention is to provide an electrical ignition apparatus for oil burners which will substantially eliminate the human factor in the servicing and installing of the burners. This aspect of the invention has particular reference to elimination of high tension cables for connecting the ignition electrodes to the transformer; the invention aims to eliminate the necessity of the service man manually making, or breaking, or disconnecting electrodes from the transformer when servicing the burner.

Among the features of the present invention are: improved conductors between the electrical transformer terminals and the ignition electrodes; an improved mounting for supporting an ignition transformer on the burner housing so that the same may be used as a cover for an access opening; improved contacting elements which automatically disconnect and connect the electrodes from the transformer terminals when the transformer is moved to open and close the access opening; and improvements in the mounting of the ignition electrodes in combination with the fuel supply conduit so that they may be adjusted longitudinally in the burner during operation of the same.

A still further object of the invention is to provide an ignition system and fuel supply means for oil burners which is simple in design and construction, and inexpensive to manufacture. Other objects and advantages will become apparent from the following detailed description of suitable embodiments of the invention made in connection with the accompanying drawings, in which like parts throughout the several views are indicated by the same numerals of reference.

Fig. 2 is a rear elevational view of the burner with parts broken away;

Fig. 3 is a front elevational view of the burner;

Fig. 4 is a fragmentary sectional view taken substantially on the line 4—4 of Fig. 1;

Fig. 5 is a fragmentary elevational detail showing the side of the transformer having the transformer terminals, and illustrating the positions of the resilient contacting elements secured thereon;

Figure 1:
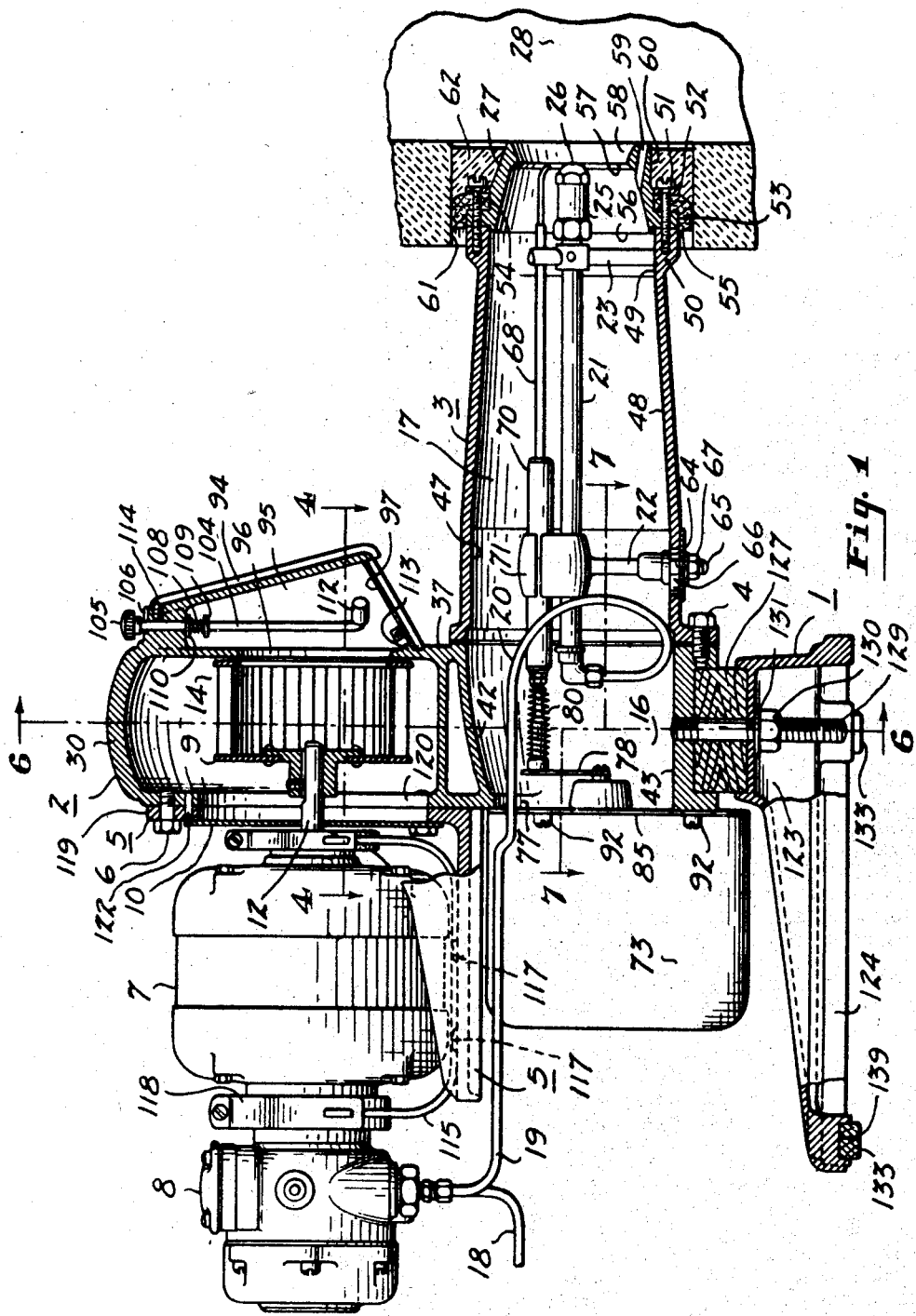
Figure 1 is a side elevational view, partly in section and with parts removed, showing a burner embodying the present invention and connected to a furnace. This view is taken substantially on the line I—I of Fig. 2.

Referring to the drawings by numerals of reference, which indicate like parts throughout the several views, the burner comprises a pedestal or base, indicated generally by the numeral 1, which is surmounted by and supports a main body portion or housing, indicated generally by the numeral 2. A horizontally disposed air or blast tube 3 is secured to the lower portion of the housing 2 at one end thereof by cap screws or studs 4 which extend through a radially directed flange 11 formed at the inlet end of the air tube. On the upper portion of the housing 2 at the end thereof opposite the blast tube 3 a supporting member or bracket 5 is removably secured by cap screws or studs 6.

The bracket 5 carries a removable unit which comprises all the movable parts of the burner including motor 7, fuel pump and pressure regulator 8, blower 9 of the sirocco type, and cover plate 10. The blower 9 is actuated and supported by shaft 12 of the motor 7 which also actuates the fuel pump. The circular cover plate 10 has a running or clearance fit on the shaft 12 between the motor 7 and blower 9.

The blower 9 is received in a chamber 14 formed in the upper portion of the housing 2 and forces air downwardly through a throat 15 tangentially into inlet end 16 of combustion air passageway 17 extending longitudinally through the bottom of the housing 2 and the air tube 3.

The fuel pump and pressure regulating device 8 draw liquid fuel through supply conduit 18 and force it under relatively high pressure through fuel pressure conduit 19 having a flexible loop 20 into fuel pipe 21 supported by bracket 22 and spider 23 in the air tube 3. A spray nozzle 25 is secured on the end of the fuel pipe 21 at the discharge end of the air tube 3 so that its outlet orifice 26 is disposed substantially in the plane of the smallest cross-sectional area portion of a burner head 27, to be later described. Air forced through the passageway 17 by the blower 9 and moving in a helical path commingles with the oil spray emerging from the nozzle orifice 26 to form a mist of finely dispersed oil particles which burn in combustion chamber 28 of a heating unit such as a domestic furnace.

The housing 2 is symmetric in external appearance and of generally ovate form as viewed from either end. It is carried in an upright position on the base 1, being of a materially greater height than width and of a materially greater width than length. The housing is of substantially uniform length from top to bottom and has a top wall 30 of generally rounded form merging into relatively straight vertical side walls 31 and 32. Inwardly curving or rounded bottom walls 33 and 34 extend downwardly as continuations of the side walls 31 and 32 and terminate in a downwardly directed socket 35, to be later described. Rear end wall 36 carries the bracket 5 which supports the removable motor unit, and front end wall 37 carries the air tube 3 as mentioned above.

Figure 6:
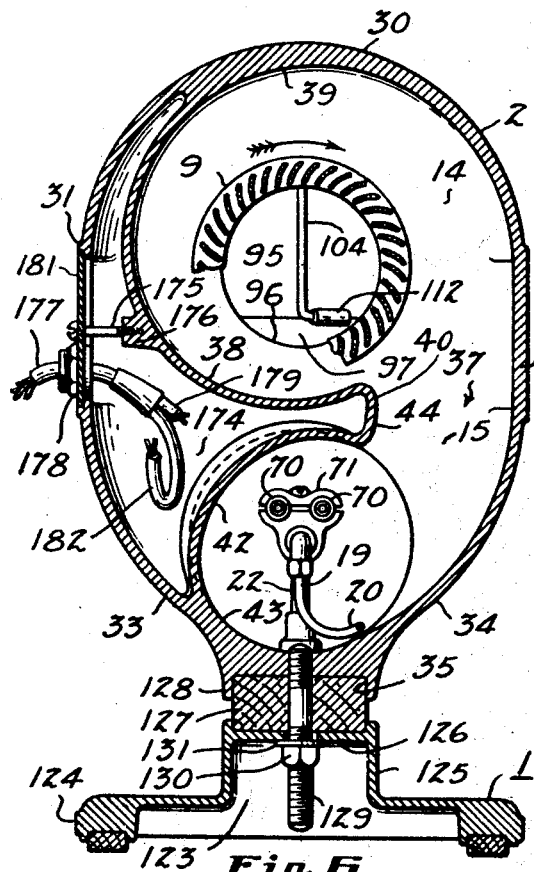
Fig. 6 is a transverse vertical sectional view, with parts removed, taken substantially on the line 6—6 of Fig. 1.
Figure 7:
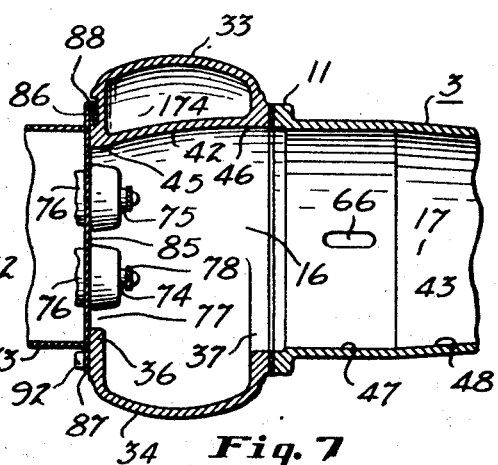
Fig. 7 is a fragmentary transverse horizontal sectional view, with parts removed, taken substantially on the line indicated at 7—7 of Fig. 1.

The blower chamber 14 (Fig. 6) is of the form commonly employed with rotary blowers of the sirocco type having axially extending blades, and is partially defined by a curved internal wall or partition 38 which extends between the end walls 36 and 37 of the housing 2 from a point 39 where it is formed into the top wall 30 of the housing at substantially the center thereof downwardly to the left in a circular fashion and then to the right, as viewed in Fig. 6. The lower end of the wall 38 extends beyond the middle of the housing and to cutoff 40 of the throat 15. The radial space between the peripheral margin of the rotary blower 9 and the walls of the chamber 14 progressively increases from the cutoff 40 in a clockwise direction around the rotational axis of the blower substantially to the throat 15. This increase in the free radial cross-sectional area of the housing available for the flow of air is in the direction of rotation of the blower rotor 9, indicated by the arrow of Fig. 6.

One side of the inlet end 16 of the passage, opposite the throat 15, is defined by an internal wall or partition 42 which starts substantially at the bottom center of the housing 2 where it is connected to the lower part of the bottom wall 33, as indicated at 43, and is then curved upwardly to the left and then to the right in a clockwise direction following the general curvature of the passage 17 as defined by the tube 3. The upper end of the partition 42 and the lower end of the partition 38 are joined by a short, vertically disposed partition 44 which partially defines the throat 15. The partition 42 is curved or sloped longitudinally of the inlet portion 16 of the air passage. This curvature is progressively increased from the lower portion 43 to the top portion where the partition 42 joins the vertical partition 44. The margin 45 of the partition 42, adjacent the end wall 36 of the housing 2, progressively approaches the axis of the air passage 17, while the margin 46 of the partition 42, adjacent the end wall 37 of the housing, remains substantially flush with the internal wall of the air tube 3.

Tube 3 is substantially circular in cross section throughout its length and has a portion 47 of cylindrical form and uniform diameter adjacent the housing 2 which merges into a tapering portion 48 which extends toward the discharge end of the tube where a second cylindrical portion 49 of uniform internal diameter and relatively short axial length is formed. The walls of the tube 3 are relatively thick and of heavy section at the discharge end thereof, preferably being in the form of an integral, thick-sectioned, annular collar 50 which reinforces the tube end and receives the screws which hold the head 27. A circular, radially directed flange 53 is integrally formed about the large diameter end of the head 27 and circumferentially abuts against the annular collar or thickened section 50 on the discharge end of the tube 3. A pair of screws 53 extend through suitable drill holes in the flange 53 and are threadedly secured in the collar 50 to clamp the head 27 in heat exchanging circumferential contact with the collar.

Another pair of screws 51 extend through an annular holding ring 52, disposed about the head 27, through the flange 53 and are threadedly received in the annular thickened collar portion 50 at the discharge end of the tube 3. The ring 52 and flange 53 preferably have substantially the same outside diameter and the ring is axially movable over an external cylindrical portion 54 of the head 27 which extends forwardly from the base of the flange 53. Between the ring 52 and flange 53, and seating on the cylindrical portion 54 of the head, is an annular ring 55 of fireproof fibrous material such as asbestos. This ring is clamped between the holding ring 52 and flange 53 by the screws 51 which also hold the head 27 to the tube 3.

The head 27 is formed to present a substantially continuous circular shoulder 56 to the advancing air and effects an agitation thereof which is beneficial in forming a suitable combustible mixture with the fuel oil. This shoulder 56 is adjacent the small diameter cylindrical portion 49 of the passageway 17 in which is located the spider 23. From the shoulder 56 the head 27 is tapered and the internal walls thereof converge to provide a progressively decreasing, substantially circular cross-sectional area in the direction of air flow. At substantially the region of smallest cross-sectional area the head 27 is formed with a shoulder 57 which further turbulates or agitates the moving air. From the shoulder 57 to the extreme end of the head 27 there is an outwardly tapering outlet or mouth 58.

A downwardly sloping passage or drill hole 59 extends through the bottom wall of the head 27 from the inside thereof between the annular shoulders 56 and 57, through a depending boss 60 integral with the head, to the foremost edge of the head. This hole serves as a drain for fuel oil that may drip from the nozzle 25 and directs the same into the combustion chamber 28. Preferably the end of the hole 59 inside the head is enlarged or dished to more effectively drain off the oil.

The bracket 22 which holds the fuel pipe 21 has a curved or cylindrical bottom surface 64 which corresponds in curvature to the internal cylindrical surface of the portion 47 of the tube 3. This curved surface 64 assists in aligning the bracket in the air passageway 17 and affords a snug fit between the bracket and tube. The bracket is held in place by a depending threaded stud 65 which extends through an elongated slot 66 formed in the bottom of the cylindrical portion 47 of the air tube 3. Preferably, the stud 65 is made separately from the bracket 22 and threadedly secured therein. Accordingly, the bracket 22 may be adjusted longitudinally in the tube 3 so as to vary the position of the nozzle 25 with respect to the head 27. A nut 67 on the stud 65 locks the bracket in adjusted position and the novel shape of the tube 3 which provides a cylindrical portion for holding the bracket 22 retains the fuel pipe 21 centered in the air passageway 17 in all positions of adjustment. The cylindrical portion 49 at the discharge end of the air tube which has a uniform internal diameter permits the spider 23 to move longitudinally in the passageway 17 while the ends of the spider legs maintain sliding engagement with the walls of the tube. Thus both ends of the fuel oil pipe 21 are supported and retained centrally in the air passageway 17 regardless of the movement of the bracket 22 and spider 23 in adjusting the nozzle 25.

A pair of ignition electrodes 68 and 69 are disposed longitudinally through the passageway 17 slightly above and on opposite sides of the oil pipe 21. These electrodes are mounted in porcelain insulators 70 held in a clamp 71 on the top of the bracket 22. The forward ends of the electrodes 68 and 69 are directed toward one another in the region of the orifice 26 of the nozzle 25 so that a spark across the electrodes ignites the atomized fuel.

A transformer, carried in a box 73 disposed against the rear end wall 36 of the housing, furnishes high tension current to the electrodes 68 and 69. Conductors or terminals 74 and 75 enclosed by insulators 76 extend into the inlet end 16 of the air passageway 17 from the transformer box 73 through an opening 77 forward in the rear wall 36 of the housing which is normally covered by the transformer box 73. Each of the conductors or terminals is provided with a spring-like brush 78 formed of suitable sheet metal such as bronze or brass and which extends upwardly and at right angles across the axes of the electrodes 68 and 69.

Figure 9:
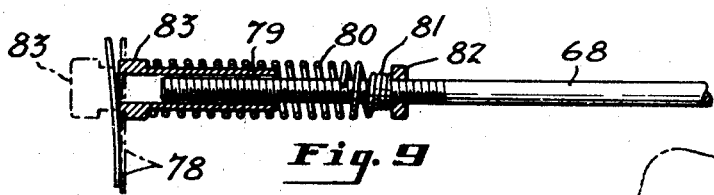
Fig. 9 is an enlarged fragmentary detail, in section, showing one construction of the electrode contacts or terminals.

Electrical contact is made between the brushes 78 and the electrodes by means of contact sleeves 79 (Fig. 9) slidably received on the threaded ends of the electrodes and urged toward the brushes 78 by helical compression springs 80. Each of the springs 80 has one end adjustably retained on the electrode by a reduced diameter portion 81 which grips the electrode, and a nut 82 which is threaded onto the electrode. The end of each of the springs 80, opposite the reduced diameter portion 81, bears against a shoulder formed by increased diameter head portion 83 of the sleeve 79. Thus the spring 80 is partially carried over the sleeve 79 to have sliding engagement therewith and prevent the individual turns of the spring from being caught on the threaded electrodes. The springs 80 are adjusted so that the heads 83 naturally take the position indicated by the broken lines in Fig. 9, and are moved to substantially the full line position when engaged by the brushes 78. In thus effecting electrical contact for the flow of current through the electrodes 68 and 69 the brushes are likewise deflected from the broken line position to the full line position of Fig. 9 and placed under stress.

Figure 8:
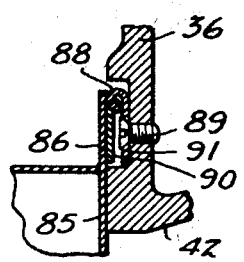
Fig. 8 is a fragmentary sectional detail taken substantially on the line 8—8 of Fig. 2, showing the hinge mounting for the electrical transformer.

The transformer box 73 has a flat plate 85 which is arranged to cover the opening 77 in the rear end wall 36 of the housing 2. Flange portions 86 and 87 of the plate 85 extend beyond the sides of the box 73 and are utilized in attaching the box to the housing. The flange 86 has a vertically disposed piano type hinge 88 secured thereto by suitable means such as spot welding. The upper portion of this hinge is seated in a recessed portion of the housing wall 36 (Fig. 8) and is secured thereto by flat head machine screw 89. The lower portion of the hinge is similarly secured to an ear 90 (Fig. 3) extending from the housing 2.

The flange 87 of the plate 85 is secured to the housing 2 and an ear 91 by fillister head screws 92 (Fig. 1). This novel mounting of the transformer facilities opening of the inlet end of the combustion air passageway 17 so that adjustment or removal of the nozzle and electrodes may be made through the rear wall of the burner. The unique contact arrangement of the high tension electrical conductors for the electrodes 68 and 69 eliminates the use of loose high tension wires, thus rendering the burner safer and less likely to get out of order. Each time the transformer box 73 is pivoted on the hinge 88 to uncover the opening 77, the secondary or high voltage connections to the electrodes 68 and 69 are automatically opened. When the transformer box 73 is pivoted to the closed position to cover the opening 77 the ignition connections to the tips of electrodes 68 and 69 are automatically closed.

Air is drawn into the burner by the blower 9 through a downwardly directed inlet opening in a hood 94 formed on the front wall 37 of the housing 2. An air chamber 95 in the hood 94 communicates with the blower chamber 14 through a circular opening 96 formed in the front wall 37 and concentric with the shaft 12 of the blower and motor.

An air gate 97 is mounted off center on reduced diameter pin ends 98 (Fig. 4) of adjustable pivot screws 99 which are threadedly carried in aligned holes through the side walls of the hood 94. The screws 99 preferably have enlarged knurled heads on the outside of the hood 94 so that they may be adjustably screwed toward or away from one another and shoulders thereof may be made to frictionally engage apertured pivot brackets 102 which are secured to the air gate 97 to support the same and are received on the pin ends 98 of the pivot screws.

An adjusting rod 104 is vertically disposed in the air chamber 95 and rotatably journaled in a drilled hole in the top of the hood 94. An enlarged knurled head 105 is secured on the top of the rod 104 above the hood 94 so that the rod can be manually rotated. An indexing pin 106 extends through the rod 104 and extends radially therefrom. The rod 104 is urged downwardly by a helical compression spring 108 which seats on a washer 109 secured on the rod 104 and a washer 110 bearing upwardly against the inside of the top wall of the hood 94. A foot is formed at the bottom of the rod 104 by bending the latter substantially through 90°. This foot is disposed a short distance above the air gate 97 when the latter is closed and it is preferably provided wih a rubber covering 112 to silence the contact between the foot and the gate when the movement of the latter is arrested by the foot. When the pivot screws 99 are loosened so that the air gate 97 is free to pivot on the pins 98, the gate is opened by the air pressure on the underside thereof when the blower 9 is rotating. The amount that the air gate will open under the influence of air pressure can be varied or adjusted by rotation of the rod 104 which moves the foot to various positions. By means of the rod 104 the opening of the gate 97 which regulates the quantity of air forced through the passageway 17 by the blower 9 can be adjusted while the burner is in operation to give the most efficient and desirable type of flame in the combustion chamber 28. The frictional effects of the pin 106 and spring 108 are adequate to temporarily hold the rod 104 while adjustment of the burner is being made. After the adjustment is complete the rod 104 is locked in position by set screw 114. As long as the blower 9 is in operation the gate 97 is held open against the foot of the adjusting rod 104. Upon shutting off the burner so that the blower 9 stops, the air gate 97 drops by gravity to the closed position illustrated in Fig. 1. Downward pivotal movement of the gate 97 is limited by a suitable stop 113 or by engagement of the edges thereof which are parallel to the axis of the pivot screws 99 with the inside bottom edge of the wall of the hood 94 or the end wall 37 of the housing 2.

The movable parts of the burner are carried by a substantially U-shaped cradle 115 secured to the floor of the supporting member or bracket 5 by studs 116 and centered thereon by raised tracks or bosses 117 (Fig. 2). The upstanding arms of the cradle 115 are provided with metal bands 118 which confine annular rubber rings or cushions (not shown) embracing the journal bosses on the bells of the motor 7. Accordingly, the motor, blower and pump are resiliently cushioned and the single rotating shaft is supported intermediate its ends at a plurality of points by rubber cushioned journals.

An upright portion 119 of the supporting member 5 is disposed against the upper portion of the rear wall 36 of the housing 2 and a circular opening 120 is formed through the portion 119 and the wall 36 to permit passage of the blower 9 when removing or replacing the movable parts or motor drive unit. This opening is closed by the cover plate 10 which is secured to the portion 119 of the bracket 5 by screws 121 (Fig. 2).

The pedestal or base 1 has a relatively large footing portion 124 which affords a wide area support for the burner. Square or rectangular pads or cushions 133 are received in sockets 139 at marginal portions of the footing portion 124 of the base. Preferably, the pads 133 are three in number and formed of resilient cushioning or vibration-absorbing material such as wood, cork, or rubber, thus effecting a quieting three point mounting for the burner. In the event that the surface on which the burner is to be supported is irregular or of uneven height, the pads 133 can be made shorter or longer, as required, so as to carry the base 1 evenly and firmly. Upwardly directed wall portions 125 formed integrally at the central portion of the front end of the base are surmounted by a substantially horizontally disposed platform portion 126. This platform is thus disposed a material distance above the surface on which the footing portion 124 of the base rests. A vibration absorbing block 127 formed of suitable material such as wood or cork is carried on the platform portion 126 and is surmounted by the housing 2. Preferably the block 127 fits into the socket 35 formed in the bottom of the housing so that the top sides of the block are embraced by depending portions 128 of the socket. Similarly, the upwardly directed walls 125 of the base extend above the level of the platform 126 to embrace the bottom sides of the block 127.

In plan form the block 127 is non-circular in shape, preferably being square or rectangular. The depending portions 128 of the socket 35 are formed to a corresponding shape as are also the upwardly projecting portions of the walls 125 of the base so that when the block 127 is properly seated on the platform 126 and in the socket 35 the burner housing 2 is correctly aligned with respect to the base 1.

A stud 129 is secured in the central portion of the socket 35 and extends downwardly through an aperture in the center of the block 127 and has a loose fit in the central hole formed in the platform 126. The parts are drawn together by a nut 130 which forces a washer 131 of a material having the capacity to deaden vibrations, such as lead, upwardly against the bottom of the platform portion 126.

Figures 10, 11:
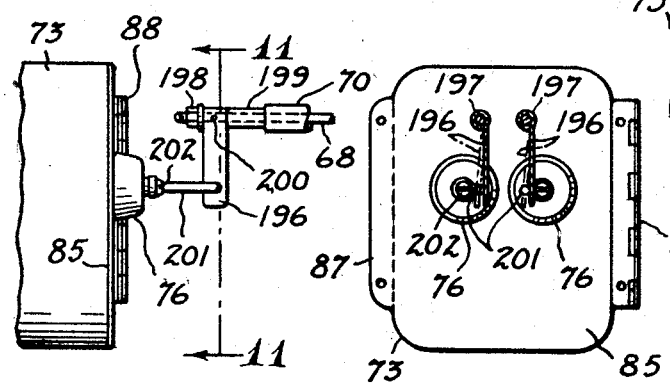
Fig. 10 is a fragmentary elevational view showing a modified construction of the resilient contact elements that connect the electrical transformer and the ignition electrodes.
Fig. 11 is an elevational view, partly in section, taken substantially on the line 11—11 of Fig. 10.
Figure 12:
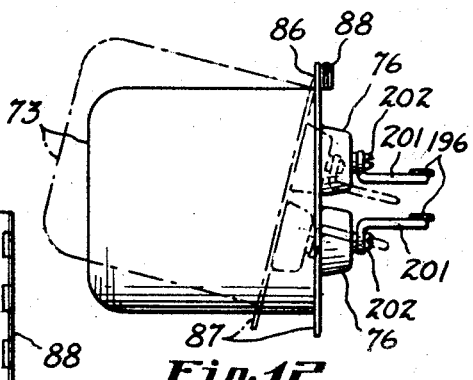
Fig. 12 is a plan view showing the electrode contact elements and the transformer conductors, illustrated in Figs. 10 and 11.

In Figs. 10 through 12 is illustrated a modification of the invention in which electrical connections between the ignition electrodes 68 and 69 and the terminals or conductors 74 and 75 of the electrical transformer 73 is made by depending spring contacts 196. These contact elements or springs are angularly disposed with respect to the electrodes and may be formed of any suitable resilient material having the necessary electrical conductivity properties, such for example, as brass or bronze. Tubular ends 197 of the elements 196 are received on the ends of the electrode bars 68 and 69 and are secured in place by nuts 198 threaded on the ends of the electrode bars, so as to press the tubular portions 197 of the contact elements against tubular spacers 199 on the electrode bars between the contact elements 196 and the porcelain insulators 70. If desired, pins 200 may be passed through suitable aligned apertures in the tubular portions 197 of the contact elements and the electrode bars 68 and 69 to resist turning of the contact elements on the bars.

Secured to the transformer terminals 74 and 75 are brass or bronze conductor bars or connectors 201 which extend or project from the transformer in parallel relation to one another so that when the transformer casing or box 73 is disposed across the opening 77 in the burner housing 2, the conductors 201 are disposed in the portion 16 of the air passage 17 formed in the lower part of the housing. If desired, the conductor bars 201 may be L-shaped, as illustrated in Fig. 12, so that they are spaced apart a distance substantially equal to the spacing of the electrode bars 68 and 69. When thus formed, the conductors 201 may be secured to the terminals 74 and 75 of the transformer by means of screws 202; if desired, the conductors may be threaded and screwed directly into the transformer terminals.

This modification of the invention provides an arrangement which automatically disconnects the transformer from the ignition electrodes when the transformer is displaced or pivoted away from the opening 77 in the burner housing in the manner previously described. When the burner is pivoted on the hinge 88 to close the opening 77, the conductor bars 201 move from the broken line position to the full line position, indicated in Fig. 12, over arcuate paths, thus automatically establishing an electrical connection between the transformer terminals and the ignition electrodes 68 and 69 as soon as the spring contacts 196 are engaged. The resilient contacts or elements 196 are initially engaged by the conductor bars 201 before the transformer casing 73 is in its final position closing the opening 77. Accordingly, during the closing of the opening by the transformer, the contact elements 196 are displaced from approximately the broken line position, illustrated in Fig. 11, to the full line position of that figure. Thus, the electrical contact or connection between each of the conductor bars 201 and the elements 196 is maintained by the resiliency of the latter. The pivotal movement of the conductor bars 201 about the axis of the hinge 88, which is offset to one side of the electrodes 68 and 69, allows one of the conductor bars to swing between the elements 196 during the closing of the transformer casing across the opening 77.

Figure 13:
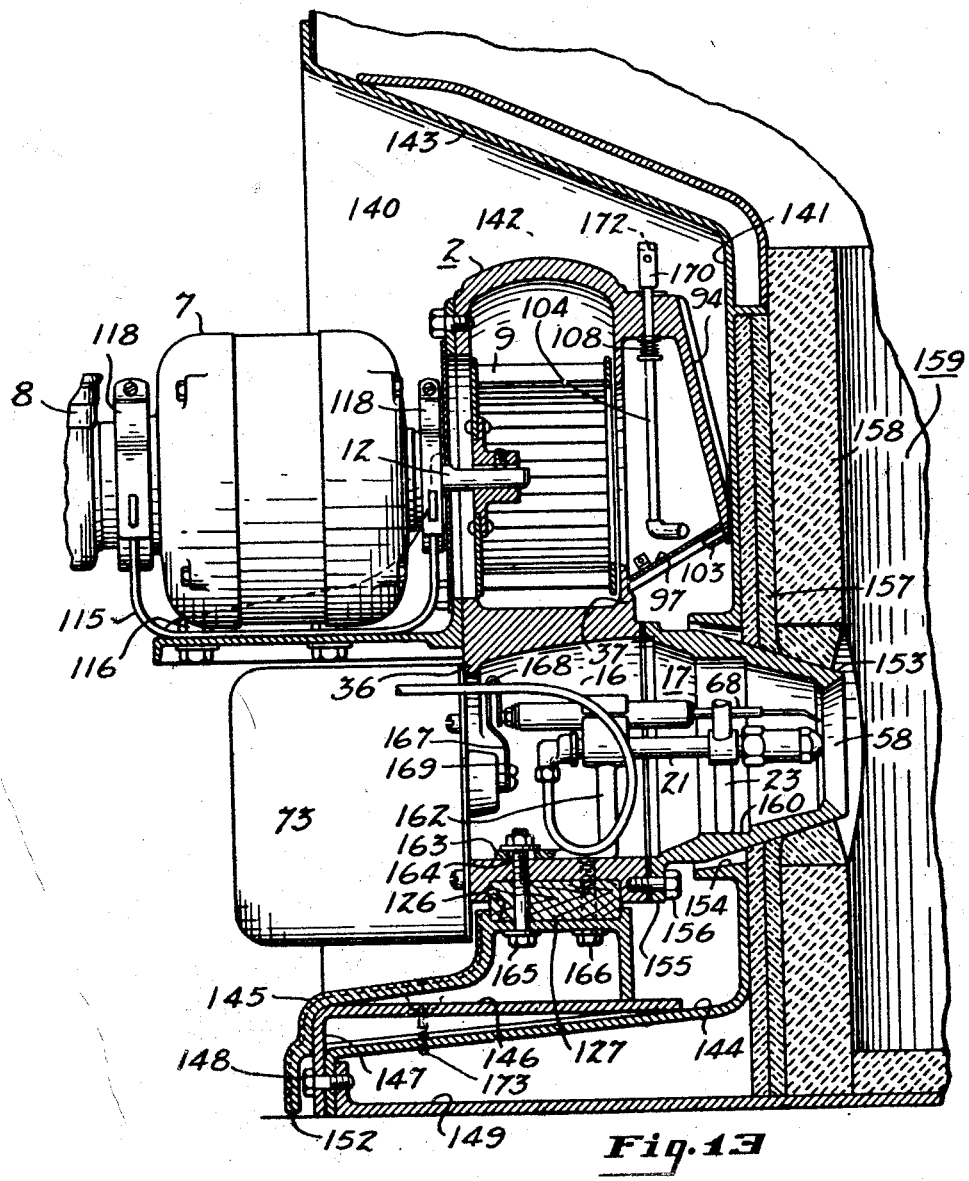
Fig. 13 is a vertical sectional view showing another modification of the invention as embodied in a burner connected to a furnace having a burner recess.

In Fig. 13 is illustrated a modified construction of the burner which is designed for use in connection with a furnace or heater having a recess or pocket 140 to accommodate the burner. Furnaces of this character are usually constructed of steel or iron and the pocket may be formed of a single casting having integral rear, side, top and bottom walls 141, 142, 143, and 144, respectively. The burner is provided with a base 145 similar to the base 1 previously described and which rests on the bottom wall 144, the latter inclining upwardly toward the rear wall 141 of the pocket 140. A horizontally disposed track 146 is positioned over the bottom wall 144 of the pocket and supports and guides the burner when the latter is slid into or out of the pocket. A depending leg portion 147 of the track 146 extends downwardly across the front marginal edge of the bottom wall 144 and is secured by a stud 148 which extends through a flange on the bottom wall and into an upwardly directed flange formed on the margin of base 149 of the furnace. The base 145 is formed with longitudinally extending bearing portions 150 which have sliding engagement with the top and sides of the track 146 at marginal edge portions so that the burner is wholly supported by the track and guided for straight line movement. Upon withdrawing the burner from the pocket 140 a depending apron 152 formed along the rear edge of the base serves as a support for the burner when the center of gravity thereof moves beyond the end of the track 146.

In order that the burner may be substantially wholly received within the pocket 140, the length of the combustion air passage 17 is materially shortened so that the mouth 58 of the head is relatively close to the inlet end 16 of the passage. Desirably, the burner may be provided with an integral head and air or blast tube 153 which projects through an opening 154 in the rear wall 141 of the pocket. The head 153 is provided with a flange 155 corresponding to the flange 11 previously described and which is disposed against the front end wall 37 of the burner housing 2, being secured thereto by studs 156. The head 153 is frusto conical in shape, converging toward the mouth 58 thereof and effecting a seal with insulating material 157 disposed in a plurality of layers between the rear wall 141 of the pocket 140 and refractory lining 158 of the furnace combustion chamber 159.

The fuel pipe 21 is supported in the head 153 by the spider 23 having sliding engagement with cylindrical portion 160 of the passage formed internally therein and which corresponds to the cylindrical portion 49 previously described. A bracket 162 positioned within the inlet end 16 of the air passageway 17 carries the fuel pipe 21 and electrodes 68 and 69 in a manner similar to the bracket 22 previously described. A horizontally disposed foot portion 163 of the bracket 162 rests on the floor of the inlet portion 16 of the air passage in the lower part of the housing 2 and has an elongated slot 164 received on the upwardly extending end of a securing bolt 165. This bolt extends upwardly through the platform portion 126 of the base 145 supporting block 127, and is threadedly secured in the bottom of the housing 2. The upwardly extending end of the bolt 165 is in the nature of a stud which receives a tightening nut to lock the bracket 162 in adjusted position. Additional holding bolts 166 extend upwardly between the platform portion 126 of the base and housing 2 through the block 127 being threadedly secured in the housing to reinforce the connection between the base and housing. The lead washers 131 are employed as previously described to deaden the transmission of vibrations from the housing to the base.

The electrical connections between the conductors 74 and 75, leading from the transformer, and electrodes 68 and 69, are effected by spring brushes 167 formed of suitable material such as bronze or brass and having a reverse bend 168 to impart increased resiliency thereto. These brushes are secured by screws 169 to the conductors 74 and 75 and extend upwardly across the axes of the electrodes 68 and 69.

The adjusting rod 104 for the air gate 97 has secured on its upper end above the hood 94 a cylindrical head 170 which has a transverse screwdriver slot 172 formed across its upper end so that adjustment of the air gate may be effected without reaching one's hand into the head 170 which is relatively close to the hot walls 141 and 143 of the furnace pocket. The spring 108 is made of sufficient strength so that the friction of the indexing pin 106 and washers 109 and 110 is sufficient to prevent inadvertent movement of the adjusting rod 104. A rubber covered pin 103 secured in the front wall of the hood 94 at the bottom inside edge thereof, limits downward pivotal movement of the air gate 97.

Desirably the burner as illustrated in Figure 13 is secured in place within the pocket 140 by screws 173 which extend through the base 145 and are threaded into the bottom wall 144 of the pocket. These screws prevent sliding movement of the base on the track 146 and resist lateral tipping and vibration of the burner. Other parts of the burner which correspond to parts previously described have been indicated by the same numerals of reference.

The unique design of the burner housing 2 provides a wiring box 174 between the outside walls of the housing and the internal partitions 38 and 42. A removable plate or plates 181 held in place by a screw or screws 175 secured in a boss 176 formed on the partition wall 38 close the opening in the side wall 31 leading into the terminal or wiring box 174. Thus but a single electrical conduit 177 leads to the burner and enters the wiring box 174 through a fitting 178 in the removable side wall plate 31. The power leads 179 to the transformer extend through a cored hole 180 in the rear wall 36 of the housing and the power leads 182 to the motor 7 pass through a cored hole 183 extending through both the rear wall 36 of the housing and the upright portion 119 of the bracket 5. Accordingly, the wiring leads for the burner are substantially concealed and protected from injury. During the opening or closing of the aperture 77 of the housing 2 by the pivoting movement of the transformer casing 73, the primary leads 179 to the transformer move through the hole 180, there being sufficient slack provided in the leads 179 within the wiring box 174 to permit this movement. As shown in Fig. 3, the hole 180 is covered by the transformer box 73 when the burner is in operation.

The fuel pressure conduit 19 extends through a slot 184 formed in the rear wall 36 of the housing and which is formed radially from the opening 77. Accordingly, when the transformer box 73 is pivoted to open position, the conduit 19 may be readily removed longitudinally through the passage 17 and out the opening 77 merely by sliding it out of the slot 184. Preferably a rubber grommet (not shown) fits around the conduit 19 in the slot 184 to prevent the flow of air therethrough and wear of the conduit on the walls of the slot.

By the use of the present invention, an ignition system may be provided for oil burners and the like which embodies numerous advantageous features that improve the operating characteristics of the burners, and which permits servicing and adjustment of the burners with a minimum of trouble and without danger to the service man. An access opening is provided through which the ignition electrode and fuel conduit assembly can be removed as a unit, this access opening normally being closed by the transformer housing, and the connections between the transformer terminals and electrodes being arranged to automatically separate when the transformer housing or casing is removed from the access opening. Thus the structure of the present invention eliminates the human factor in the servicing of burners with respect to the making and breaking of the electrical contacts between the transformer terminals and the ignition electrodes. The elimination of a flexible high tension cable is important because such cables are subject to injury caused by repeated bending or deflection and to the deleterious effects of moisture and oil.

The constructions supporting the ignition electrodes and fuel conduits in the air tubes and burner heads of the different embodiments of the invention permit the electrodes and fuel conduits to be readily adjusted without removal of the burner from the furnace, and in the case of the burner illustrated in Fig. 1, the adjustment of the electrodes and fuel conduit can be effected while the burner is in operation.

The principles of the present invention may be incorporated in various structures, the embodiments shown in the drawings and described above being given merely for purposes of explanation and illustration, it being understood that numerous modifications are contemplated and intended to be included within the scope of the appended claims.

What I claim is:

1. In an oil burner or the like having an elongated electrode, a contact slidingly mounted in telescopic embracing on one end of the electrode, a transformer for furnishing electrical ignition current and means supporting the same adjacent said electrode end, terminal means carried by the transformer, and a spring embracing the electrode and having connection with the contact to normally press the latter and slide the contact along the electrode and yieldingly against the terminal means to provide a path for electric current from the transformer to the electrode.

2. In an oil burner or the like having structure defining a passage for combustion air and an ignition electrode supported rigidly in the passage and provided with a free rod-like end, means defining an opening into the passage, a transformer for supplying electric ignition current and having a terminal, means for mounting the transformer across the opening with the terminal normally extending into the latter in predetermined position and for facile removal of the transformer from the opening, a tubular contact slidably mounted on said rod-like end of the electrode, and resilient means embracing the electrode and the contact for yieldingly holding the contact against the transformer terminal to provide a path for electric current from the transformer to the electrode.

3. In an oil burner or the like, a housing formed to provide a passage for combustion air, ignition electrodes supported in the passage, mean defining an opening in the housing communicating with said passage, a transformer having high tension terminals, means pivotally mounting the transformer on the housing to swing horizontally to an operative position across said opening to close the same and in which the terminals extend through said opening and automatically make contact with the electrodes within the passage, and electrical conductor means having connection with the transformer to supply electric current thereto.

4. In an oil burner or the like, a housing formed to provide a passage for combustion air, ignition electrodes supported in the passage, means defining an opening in the housing communicating with said passage, a transformer having high tension terminals, means pivotally mounting the transformer on the housing to swing to an operative position across said opening to close the same, means providing a second opening in the housing adjacent the pivotal axis of the transformer and located so as to be covered by the transformer in operative position, means connecting the transformer terminals and the electrodes through said first named opening, and a flexible conductor connected to the transformer and extending through said second opening for connection within the housing to a source of electric current.

5. In apparatus of the character described, housing means providing an air chamber and an opening into the chamber, ignition electrodes and fuel supply means having adjustable connection with the housing means for supporting the electrodes and the fuel supply means as an adjustable unit in the chamber, an electrical transformer removably secured to the housing means over said opening and constituting a closure for said opening, said transformer having electrical conductors extending into the chamber through said opening, and resilient means supported to yieldingly and automatically make and interrupt electrical connection between the conductors and said electrodes within said chamber during assembly and disassembly of the apparatus whereby in assembling the transformer with the housing means the conductors are projected through said opening into the housing and electrical connection between the conductors and the electrodes is automatically effected within the chamber, said resilient connecting means permitting movement of the electrode and fuel supply unit relative to the transformer conductors in adjusting said unit while maintaining said electrical connection between the electrodes and the conductors.

6. In apparatus of the character described, a housing structure defining a passage for combustion supporting air, ignition electrodes and fuel supply conduit means, means having connection with the structure for supporting the electrodes and the fuel supply conduit means as a unit in the passage for longitudinal adjustment, said structure having an opening through which the electrodes with the fuel supply conduit means and the supporting means are removable as a unit from the passage, an electrical transformer disposed across said opening to normally close the same, means securing the transformer to the structure in predetermined position and for facile removal therefrom to permit separate removal or adjustment of the unit, and separable cooperating contact means carried by the electrodes and the transformer and adapted automatically to interrupt electrical connection between the transformer and the electrodes upon removal of the transformer and to make such electrical connection through said opening upon replacement of the transformer in said position, said contact means including a pair of elements one of which is yielding and resilient to compensate for substantial relative movement of the other element of the pair upon longitudinal adjustment of the electrodes in the passage and to retain said electrical connection in all positions of adjustment of the unit.

7. In apparatus of the character described, housing means providing an air chamber and an opening into the chamber, ignition electrodes and means supporting the same in the chamber, an electrical transformer and means mounting the same on the housing means for swinging movement about a substantially vertical axis to and from a predetermined position across said opening, said transformer constituting a closure for the opening when in said position and uncovering the opening when moved away therefrom to permit adjustment or removal of the electrodes through the opening while the transformer remains mounted on the housing means, contacts projecting from one side of the transformer so as to be swung through said opening and into the air chamber upon movement of the transformer to said position, and yielding means for effecting electrical contact between the electrodes and said contacts only when the latter are through the opening and in the chamber.

8. In apparatus of the character described, housing and tube means providing an elongated air passage having an axial opening into one end thereof and a discharge outlet at the other end thereof, a fuel conduit and electrode means disposed in the air passage, adjustable means having connection with said first named means for removably supporting the conduit and electrode means as a unit in the passage, a transformer for supplying electric ignition current and means pivotally mounting the same on said first named means to swing horizontally to and from a position across said opening in which the transformer constitutes a closure for the opening, conductor means on the transformer and projecting therefrom so as to extend through the opening and into said air passage when the transformer is in said position, and separable contact means on the electrode means and the conductor means adapted to automatically make an electrical connection therebetween when the transformer is moved to said position and to automatically interrupt such electrical connection when the transformer is swung away from said position, whereby facile axial adjustment or removal of said unit can be effected through said opening.

9. In apparatus of the character described, housing and tube means providing an elongated air passage having an axial opening into one end thereof and a discharge outlet at the other end thereof, a fuel conduit and electrode means disposed in the air passage, adjustable means having connection with said first named means for removably supporting the conduit and electrode means as a unit in the passage, a closure and means pivotally mounting the same on said first named means to swing horizontally to and from a position across said opening, conductor means on the closure and projecting therefrom so as to extend through the opening and into said air passage when the closure is in said position, and separable contact means on the electrode means and the conductor means adapted to automatically make an electrical connection therebetween when the closure is moved to said position and to automatically interrupt such electrical connection when the closure is swung away from said position, whereby facile axial adjustment or removal of said unit can be effected through said opening.

10. In apparatus of the character described, housing means providing an air chamber and an opening into the chamber, ignition electrodes and means having connection with the housing means for supporting the electrodes in the chamber, partition means within said housing means providing a wiring box separated from said air chamber, a transformer having primary and secondary circuits for supplying electric ignition current removably mounted on the housing means over said opening and constituting a closure for said opening, conductor means on the transformer connected to the secondary circuit thereof and extending into the chamber through said opening, separable contact means on the electrodes and the conductor means adapted automatically to make an electrical connection therebetween and within the air chamber when the transformer is mounted on the housing means and automatically to interrupt such electrical connection when the transformer is removed from the housing means, and flexible electrical conductor means connected to the transformer primary circuit and extending therefrom directly through the housing means in a locus of the latter normally covered by the mounted transformer and directly into the wiring box for connection in the latter to a suitable source of electric power, whereby the transformer can be readily removed from the opening for inspection of the supported electrodes and whereby said flexible conductor means is wholly concealed and protected by the mounted transformer and is separated from the air chamber containing the electrodes by said partition means.

11. In apparatus of the character described, housing means providing an air chamber and an opening into the chamber, ignition electrodes and means having connection with the housing means for supporting the electrodes in the chamber, partition means within said housing means providing a wiring box separated from said air chamber, a transformer having primary and secondary circuits for supplying electric ignition current removably mounted on the housing means over said opening and constituting a closure for said opening, conductor means on the transformer connected to the secondary circuit thereof and extending into the chamber through said opening, separable contact means on the electrodes and the conductor means adapted automatically to make electrical connection therebetween and within the air chamber when the transformer is mounted on the housing means and automatically to interrupt such electrical connection when the transformer is removed from the housing means, and electrical conductor means connected to the transformer primary circuit and extending therefrom into the housing means in a locus of the latter normally covered by the mounted transformer and into the wiring box for connection in the latter to a source of electric power, whereby the transformer can be readily removed from the opening for inspection or removal therethrough of the electrodes and whereby said conductor means is wholly concealed and protected by the mounted transformer and is separated from the air chamber containing the electrodes by said partition means.

REGINALD W. BECKETT.